May 31, 1927.

A. R. PITMAN 1,630,309

FRYING APPARATUS

Filed Dec. 18, 1926

Inventor

Arthur R. Pitman.

By Clarence A. O'Brien
Attorney

Patented May 31, 1927.

1,630,309

UNITED STATES PATENT OFFICE.

ARTHUR R. PITMAN, OF LYNN, MASSACHUSETTS.

FRYING APPARATUS.

Application filed December 18, 1926. Serial No. 155,659.

This invention relates to an improved apparatus for use in bakeries, lunch rooms, and kitchens, for frying doughnuts, potatoes, oysters, etc.

Briefly, the invention has reference to a suitable support, a hot grease kettle or container supported thereon, and a wire basket supported on the kettle and depending into the same and constructed to accommodate the food being treated.

My principal aim is to generally improve upon structures of this class by providing one of exceptional simplicity and durability, which includes, as one feature, a drain for the grease container, and which also includes a novel means for heating the grease in such container.

Other features and advantages of the invention will become apparent from the following description and drawings.

In the accompanying drawings forming a part of this application, and in which like numerals are employed to designate parts throughout the same:—

Figure 1:
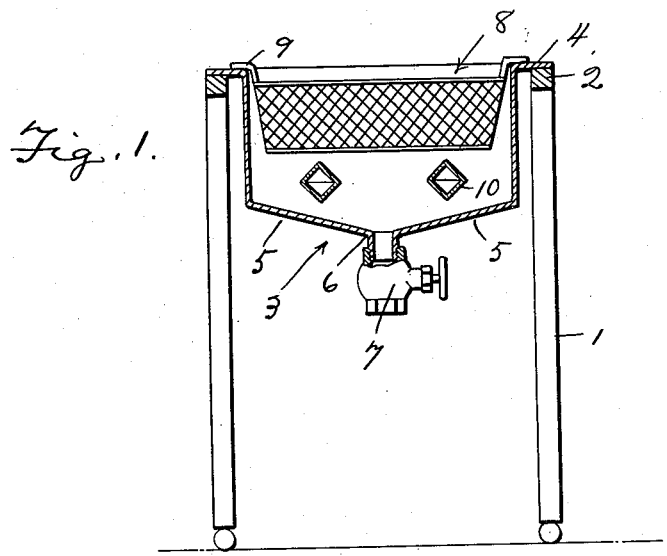
Figure 1 is a view in section and elevation of the complete structure.
Figure 2:
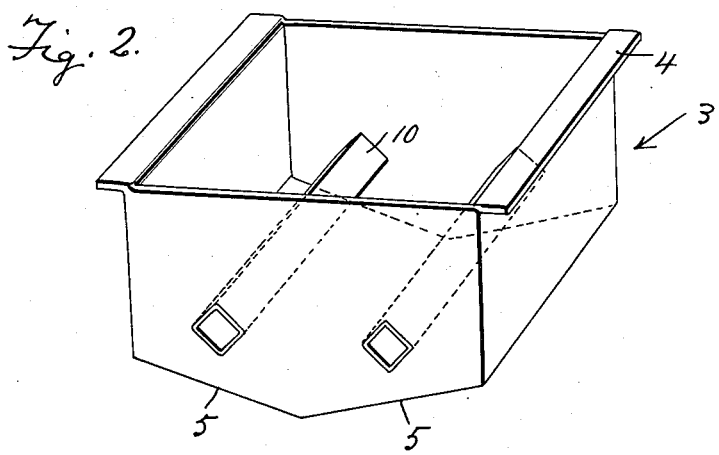
Fig. 2 is a perspective view of the grease container.

Referring to the drawing, in detail, it will be seen that the supporting structure comprises legs 1 connected together at their upper ends by cross pieces 2. Supporting on the latter, is a metal box-like container 3 for the grease. The end walls of this container are provided with horizontal supporting flanges 4 which rest on the top pieces 2. The bottom of the container includes downwardly and inwardly inclined bottom portions 5, at the juncture of which is a depending grease discharge neck or drain 6 with which a control valve 7 is connected.

Supported in the container is a wire mesh basket 8 adapted to contain the food particles, and this basket is provided with appropriate supporting brackets or hangers 9 resting upon the flanges 4.

Figure 3:
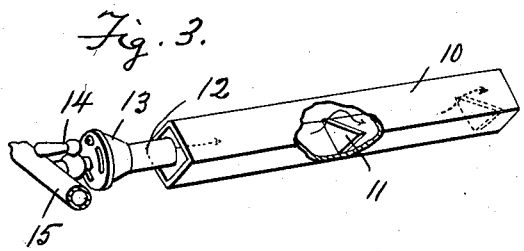
Fig. 3 is a perspective view of one of the heating elements and of fuel supply devices therefor.

Supported within the casing are heating elements each of which includes a substantially rectangular hollow tube 10 extending through the opposite side walls of the container. This tube is provided on its interior with the baffle plates 11 for distribution of the heat particles passing therethrough. As shown in Fig. 3, a gas burner 12 projects into one end of the tube and is provided with a mixing device 13, a control valve 14, and a gas conducting and supply manifold 15.

It is of course understood that the heat may be derived from some other source rather than the gas. For instance, an electrical resistance element (not shown) might be substituted.

In practice it is obvious that the grease is placed in a metal container, and the heating elements are made hot to in turn boil the grease. Then the basket containing the food particles is set in place and said articles are fried in a well known manner.

The undesirable grease can be drained thru the discharge means and through a suitable conducting pipe (not shown) to any suitable source of deposit.

By considering the description in connection with the drawings, a clear understanding of the invention will be had. Therefore, a more lengthy description is thought unnecessary.

Minor changes coming within the field of invention claimed may be resorted to if desired.

Having thus described my invention, what I claim as new is:—

1. In a structure of the class described, a support, a grease container of box-like form having outstanding supporting flanges, inclined bottom portions and a valved drain at the center of the bottom, together with tubes extending across the interior of the container, adapted to receive suitable heating means, said tubes being provided with longitudinally spaced internal baffles for distribution of the heat.

2. In a baffle of the class described, a support, a box-like grease container provided with a valved drain at its bottom, provided with internal hollow tubes adapted for reception of heat means, said container being provided with outstanding supporting flanges to rest on said support, and a wire basket fitted into said container and provided with hangers adapted to rest on said flanges.

In testimony whereof I affix my signature.

ARTHUR R. PITMAN.